United States Patent Office 3,457,240
Patented July 22, 1969

3,457,240
PROCESS FOR THE MANUFACTURE OF
POLYMALEIC ANHYDRIDE
Claus Heuck, Hofheim, Taunus, Germany, and Michael Lederer, Frankfurt am Main, Germany, assignors to Farbwerke Hoechst Aktiengesellschaft vormals Meister Lucius & Brüning, Frankfurt am Main, Germany, a corporation of Germany
No Drawing. Continuation-in-part of application Ser. No. 302,710, Aug. 16, 1963. This application Aug. 8, 1966, Ser. No. 570,738
Int. Cl. C08f 3/48
U.S. Cl. 260—78.4    8 Claims

ABSTRACT OF THE DISCLOSURE

A process for the manufacture of polymaleic anhydride is provided which allows the production of the polymer with free radical polymerization catalysts at a rapid rate in good yields. This process comprises polymerizing at a temperature within the range of 40 to 100° C. maleic anhydride dissolved in 10 to 60%, calculated on the total weight of the solution, of at least one organic solvent which is selected from the group consisting of dialkyl ethers in which the alkyl chains contain 1 to 4 carbon atoms, tetrahydrofurane, dioxane, esters of aliphatic saturated monocarboxylic acids having up to 4 carbon atoms and aliphatic monohydric alcohols having up to 4 carbon atoms, benzene, chloroform, or mixtures of one of these solvents with carbon tetrachloride or acetic anhydride, in the presence of 2 to 4%, calculated on the weight of maleic anhydride, of a free radical polymerization catalyst which is selected from the group consisting of diisopropyl percarbonate, dicyclohexyl percarbonate, dibenzoyl peroxide, dilauryl peroxide and peracetic acid.

---

This application is a continuation-in-part application of our application Ser. No. 302,710 filed Aug. 16, 1963, now abandoned, and relates to a process for the manufacture of polymaleic anhydride by polymerization of maleic anhydride under the action of free radical polymerization catalysts.

Monomeric maleic anhydride can be copolymerized with polymerizable vinyl compounds, for example styrene or vinyl acetate. In the polymerization the two unsaturated components, maleic anhydride/vinyl component generally react with one another in a molar ratio of 1:1.

Furthermore, it is known (cf. Journ. of Polymer Science, 55 (1961), December, number 162, page S31), that monomeric maleic anhydride can be polymerized alone under specific reaction conditions, i.e., without the addition of another vinyl compound. According to the aforesaid publication maleic anhydride can be polymerized under the conditions recited below:

(1) In the molten state, or with the use of benzene or ethyl acetate as solvent, under the action of $\gamma$-rays with the aid of a cobalt [60] radiating system;
(2) By radiation with ultraviolet light in the presence of diacetyl as free-radical-liberating agent;
(3) In the molten state with the addition of benzoyl peroxide as free-radical-liberating activator.

The polymerization periods required vary between 2 and 8 days, conversions of 14.45 to 90% being obtained. The polymerization of maleic anhydride under the action of ultraviolet light, even with the addition of diacetyl as free-radical-liberating agent, takes still longer polymerization times.

The polymerization of maleic anhydride in the molten state with the addition of dibenzoyl peroxide as free-radical-liberating agent carried out at a polymerization temperature of 70° C. gives a yield of only 33.6% of polymaleic anhydride after a polymerization period of 2 days.

On account of the long polymerization periods required the conversions obtained in the processes described above do not enable maleic anhydride to be polymerized on an industrial scale.

It has now been found that polymaleic anhydride can be produced in a satisfactory way by dissolving maleic anhydride in an anhydrous inert organic solvent and polymerizing it under the action of free radical polymerization catalysts. By inert organic solvents there are to be understood in the following description and in the claims those solvents which do not react with maleic anhydride under the polymerization conditions applied. There are mentioned by way of example:

Dialkyl ethers, especially dialkyl ethers in which the alkyl chains contain 1–4 carbon atoms; cyclic ethers, for example tetrahydrofurane or dioxane. Especially suitable solvents are, however, benzene and chloroform. The solvents can be used either alone or in admixture with one another. It is likewise possible to use the aforesaid anhydrous solvents together with other anhydrous solvents, such as perhalogenated hydrocarbons, for example carbon tetrachloride, or dicarboxylic anhydrides, for example acetic anhydride or esters of organic acids and alcohols, particularly esters of aliphatic saturated monocarboxylic acids having up to 4 carbon atoms and aliphatic saturated monohydric alcohols having up to 4 carbon atoms. If the latter solvents are concomitantly used they should be applied in an amount not exceeding 50% by weight, calculated on the total amount of solvents.

In the polymerization process according to the invention the purity of the maleic anhydride and of the solvents used for preparing the maleic anhydride solutions is of special importance.

The maleic anhydride has to be anhydrous and free of maleic acid. Maleic anhydride was, therefore, used in freshly distilled form. It was refined by vacuum distillation in a dry nitrogen current. All precautions being taken, any formation of maleic acid by a possible access of humidity was excluded. For the same reason, the benzene or chloroform used as solvent was subjected to a predrying and distillation step. The maleic anhydride treated in this manner and used as starting material for the polymerization formed a clear solution in dry benzene. An opalescence or slight turbidity of such a solution indicates the presence of maleic acid, which is difficultly soluble in benzene and, according to gained experience, troubles or fully impedes the polymerization reaction.

The process of the invention offers the important industrial advantage that monomeric maleic anhydride, dissolved in an inert organic solvent, for example benzene and/or chloroform, can be polymerized under the action of free radical polymerization catalysts already within the course of several hours, for example 5–20 hours, yields of 70–85% of polymaleic anhydride being obtained. Suitable catalysts are, for example, organic per-compounds. It is especially advantageous to use a compound selected from the group consisting of organic percarbonates, diacyl peroxides and organic per-acids. Those skilled in polymer chemistry know that the three latter classes comprise a host of compounds; therefore, in the present case there are to be understood, as generally known representatives, without this representing a limitation of the invention, such compounds as diisopropyl percarbonate, dicyclohexyl percarbonate, dilauryl peroxide, dibenzoyl peroxide, and acetoper-acid in anhydrous form.

The solutions subjected to polymerization according to the process of the invention generally contain 10 to 60% and preferably 20 to 40% of maleic anhydride, calculated on the total weight of the solutions.

The free radical polymerization catalysts are generally used in an amount of 2–40% and more preferably 5–25%, calculated on the weight of maleic anhydride. They can be used in substance or in the form of solutions in inert solvents preferably containing at least 1% of catalyst. It is recommended to use the same solvent as is used for the dissolution of maleic anhydride, i.e., with special advantage benzene and/or chloroform.

The peroxy compounds used as catalysts can be added in usual manner in the chosen amount either all at a time or preferably in increments or continuously in the course of polymerization in solid or dissolved form to the solution of maleic anhydride heated at the reaction temperature, for example 70 to 75° C. When polymaleic anhydride of high molecular weight is to be produced, a continuous addition of the catalyst in dissolved form has proved especially suitable.

In many cases it is advantageous to add, besides the catalyst, a co-catalyst accelerating the decomposition of the catalyst to yield free radicals. Especially suitable co-catalysts are heavy metal compounds which are soluble in organic solvents, for example compounds of iron, cobalt, manganese and copper, if desired in combination with zinc compounds soluble in the reaction medium. Suitable metal compounds are, for example: iron stearate, cobalt naphthenate, manganese octoate, manganese oleate and zinc stearate. The use of the aforesaid co-catalysts is especially suitable in polymerizing larger batches. In this case the addition of the aforesiad metal compounds, which promote the decomposition of the peroxy compounds, cause an early starting of the polymerization and warrant a uniform progress of the reaction. With reactions on a laboratory scale, the use of the said co-catalysts may be dispensed with. The metal compounds are used in an amount of up to 0.1% preferably up to 0.05%, calculated on the weight of maleic anhydride.

When co-catalysts of this kind are used the reaction temperature may be reduced.

The required polymerization temperature largely depends on the constitution of the free radical polymerization catalyst and the co-catalyst accelerating the decomposition of the activator to radicals. In general, the reaction temperature ranges from 40 to 100° C., preferably from 50 to 80° C.

In some cases, especially when using solvents having a low boiling point, the reaction must be carried out under pressure. The pressure applied should be so high that the solvent or the solvent mixture used is present in liquid form. Alternatively, higher pressures may be applied.

It is suitable to use those inert solvents for the monomeric maleic anhydride which do not dissolve the formed polymaleic anhydride, for example benzene or chloroform, i.e., to carry out the polymerization according to a precipitation polymerization process. In this case the polymerization product is obtained in the form of a powder and can be readily filtered off or separated in a filtering centrifuge.

The polymaleic anhydride produced by the process of the invention often contains a small proportion of monomeric maleic anhydride which can be removed by an extraction with a solvent for monomeric maleic anhydride or by repeated dissolution and reprecipitation. Suitable substances for the extraction are benzene or ethyl ether.

The polymaleic anhydride obtained by the process of the invention is obtained in the form of a white or grey powder. It can be dissolved in water at room temperature, and more expediently at a slightly elevated temperature. The product dissolves with a noticeable evolution of heat resulting from the hydration of the anhydride groups. In the course of dissolution the polymer product first turns strongly yellow, for a still unknown reason. After complete dissolution of the polymer, either at room temperature or at slightly elevated temperature, which takes a short time, the solution substantially loses its colour.

Solutions of polymaleic anhydride in ethyl acetate and aqueous solutions of polymaleic acid prepared from the anhydride in the presence of water have a much higher viscosity than corresponding solutions having the same concentration of the monomeric starting materials maleic anhydride or maleic acid.

An analysis of a polymerization product of maleic anhydride showed the following values.

*Content.*—Calculated: C, 48.99%; H, 2.05%; O, 48.94%. Found: C, 48.4%; H, 2.9%; O, 48.9%.

Infrared measurements indicated the absence of double bonds and the presence of dicarboxylic anhydride rings and carbon-carbon bonds in the polymer chain.

The polymaleic anhydrides produced by the process of the invention can be used in many fields of application, for example as intermediate products for the manufacture of polymaleic esters, for finishing textiles, for example as levelling agents in the dyeing of textiles, or for cleaning metal surfaces.

The following examples serve to illustrate the invention but they are not intended to limit it thereto.

EXAMPLE 1

In a three-necked stirring flask provided with reflux condenser 200 grams of maleic anhydride (dist.) were dissolved in 400 cc. of benzene while heating to 75° C. A solution of 16 grams of diisopropyl percarbonate in 160 cc. of benzene was slowly dropped into the reaction mixture in the course of 8 hours. After the addition of the catalyst solution the mixture was stirred for a further 2 hours at 75° C. The polymaleic anhydride was obtained in the form of a powder in suspension which could be readily separated by filtration.

After drying, suitably in a vacuum dryer at 50° C., the yield of crude polymaleic anhydride amounted to 170 g. (85% of the theoretical).

The product was extracted with ether and 152 grams of polymaleic anhydride (76% of the theoretical yield) were obtained in the form of a fine white powder.

EXAMPLE 2

200 grams of maleic anhydride (dist.) and 0.001 gram of cobalt acetate were dissolved in 500 cc. of benzene in the apparatus as described in Example 1 and the solution was heated to 70° C. while continuously stirring. A solution of 20 grams of dibenzoyl peroxide in 150 cc. of benzene was slowly dropped into the reaction mixture in the course of 8 hours. After a short time of reaction the mixture turned violet. The reaction time being terminated the mixture was stirred for a further two hours at 80° C. The polymaleic anhydride formed could be readily filtered off. It was further processed as described in Example 1. The yield of crude polymaleic anhydride amounted to 144 grams (72% of the theoretical) and the yield of pure polymaleic anhydride was 130 grams (65% of the theoretical). The polymaleic anhydride was obtained in the form of a light grey, very voluminous powder.

EXAMPLE 3

200 grams of maleic anhydride were dissolved as described in Examples 1 and 2 in 400 cc. of benzene and 50 cc. of carbon tetrachloride while stirring continuously. A solution of 20 grams of dicyclohexyl percarbonate in 150 cc. of benzene was slowly dropped into the reaction mixture in the course of 12 hours at the same temperature. When the addition of the catalyst solution was terminated the reaction mixture was stirred for a further 2 hours at 75° C. for completing the polymerization reaction. The polymaleic anhydride was obtained in the form of a fine suspension. It was filtered off at room temperature. The yield of crude polymer amounted to 174 grams, corresponding to 87% of the theoretical.

After having extracted with ether, 165 grams (82% of the theoretical yield) of pure polymaleic anhydride were obtained in the form of a white powder which turned superficially yellow in contact with moist air.

EXAMPLE 4

200 grams of maleic anhydride were dissolved at 75° C. in 500 cc. of benzene. A solution of 50 grams of dilauryl peroxide in 150 cc. of benzene was added dropwise as catalyst in the course of 9 hours at the same temperature. After a short time of reaction the solution turned yellow. When the addition of the activator solution was terminated after 9 hours the mixture was stirred for a further 2 hours at 80° C. whereupon the polymerization product was filtered off.

After drying, 164 grams of crude polymer were obtained, corresponding to 82.0% of the theoretical yield.

The crude polymer was extracted with ether. 152 grams of pure polymer were obtained (76% of the theoretical yield) in the form of a weakly yellow fine powder.

EXAMPLE 5

200 grams of maleic anhydride were dissolved in 500 cc. of benzene while heating to 75° C. and stirring. A solution of 20 grams of dicyclohexyl percarbonate in 150 cc. of benzene was slowly dropped in as catalyst within the course of 4 hours. The addition being terminated, there were slowly added to the reaction mixture a solution of 70° C. of 200 grams of maleic anhydride in 200 cc. of benzene and separately a solution of further 20 grams of dicyclohexyl percarbonate in 150 cc. of benzene. The total time of polymerization was 8 hours. The polymaleic anhydride formed separated in the form of a fine white powder which could be readily filtered off. 360 grams of crude polymaleic anhydride were obtained (90% of the theoretical yield). After purification the yield of pure product amounted to 348 grams (87% of the theoretical).

EXAMPLE 6

200 grams of maleic anhydride were dissolved in 400 cc. of chloroform (dist.) while heating to 50° C. A solution of 20 grams of dicyclohexyl percarbonate in 150 cc. of chloroform was slowly added dropwise within the course of 6 hours, while continuously and intensely stirring. The polymerization temperature was 50° C. for the whole duration of the reaction. For accelerating the formation of radicals 0.010 gram of cobalt stearate was added as co-catalyst. When the addition of the catalyst was terminated the pink-violet reaction mixture was stirred for a further 2 hours at 50° C. The mixture was cooled, the separated polymaleic anhydride was filtered off and dried under reduced pressure at about 40° C. 172 Grams of crude polymaleic anhydride were obtained, corresponding to 86% of the theoretical yield.

We claim:

1. A process for the manufacture of polymaleic anhydride which comprises polymerizing at a temperature within the range of 40 to 100° C. maleic anhydride dissolved in 10 to 60%, calculated on the total weight of the solution, of at least one organic solvent which is selected from the group consisting of dialkyl ethers in which the alkyl chains contain 1 to 4 carbon atoms, tetrahydrofurane, dioxane, esters of aliphatic saturated monocarboxylic acids having up to 4 carbon atoms and aliphatic monohydric alcohols having up to 4 carbon atoms, benzene, chloroform, or mixtures of one of these solvents with carbon tetrachloride or acetic anhydride, in the presence of 2 to 4%, calculated on the weight of maleic anhydride, of a free radical polymerization catalyst which is selected from the group consisting of diisopropyl percarbonate, dicyclohexyl percarbonate, dibenzoyl peroxide, dilauryl peroxide and peracetic acid.

2. A process for the manufacture of homopolymeric polymaleic anhydride, comprising the steps of:
   (a) dissolving in an anhydrous inert organic solvent anhydrous maleic anhydride being free of maleic acid of from about 10% to about 60% based on the total weight of the solution, said solution being characterized as one in which the final product is insoluble, said solvent being selected from at least one member of the group consisting of:
      (1) dialkyl ethers, wherein the alkyl moieties are from 1 to 4 carbon atoms,
      (2) tetrahydrofurane,
      (3) dioxane,
      (4) benzene, and
      (5) chloroform;
   (b) reacting at a temperature of 40° C. to about 100° C. said dissolved maleic anhydride in the presence of 2 to 40%, calculated on the weight of maleic anhydride monomer, of a free radical catalyst selected from at least one member of the group consisting of diisopropylpercarbonate, dicyclohexylpercarbonate, dibenzoylperoxide, dilaurylperoxide, and peracetic acid, and
   (c) recovering the homopolymeric polymaleic product as a filterable powder.

3. The process according to claim 2 wherein the concentration of catalyst is between about 5 to 25%.

4. The process according to claim 2 wherein the catalyst is added continuously.

5. The process according to claim 2 wherein the concentration of monomer in the solvent is between about 20 and 40%.

6. The process of claim 2 wherein the solvent is benzene.

7. The process of claim 2 wherein the solvent is chloroform.

8. The process according to claim 2 wherein the anhydrous inert organic solvent is used with an anhydrous cosolvent selected from at least one member of the group consisting of carbon tetrachloride, acetic anhydride and esters of organic acids and alcohols wherein the organic acids are saturated aliphatic monocarboxylic acids of up to 4 carbon atoms, and the alcohols are saturated aliphatic monohydric alcohols of up to 4 carbon atoms, said cosolvent being used in an amount not exceeding 50% by weight based on the total weight of the solvents, and the free radical catalyst is used with a cocatalyst selected from the group consisting of iron stearate, cobalt naphthenate, manganese oleate, and manganese octoate in an amount up to about 0.1% based on the weight of maleic anhydride present.

References Cited

UNITED STATES PATENTS

| | | | |
|---|---|---|---|
| 2,504,074 | 4/1950 | Jones | 260—8 |
| 2,965,594 | 12/1960 | Maeder | 260—29.6 |
| 2,982,762 | 5/1961 | Voeks et al. | 260—88.3 |
| 3,186,972 | 6/1965 | Lang et al. | 260—78.4 |
| 3,222,328 | 12/1965 | La Combe et al. | 260—80.5 |
| 3,385,834 | 5/1968 | Merijan | 260—78.4 |

JOSEPH L. SCHOFER, Primary Examiner

C. A. HENDERSON, Jr., Assistant Examiner

PO-1050
(5/69)

UNITED STATES PATENT OFFICE
CERTIFICATE OF CORRECTION

Patent No. 3,457,240      Dated July 22, 1969

Inventor(s) Claus Heuck and Michael Lederer

It is certified that error appears in the above-identified patent and that said Letters Patent are hereby corrected as shown below:

In the heading, Column 1, line 11, insert:

"Claims priority, application Germany,
August 18, 1962, F 37,622."

SIGNED AND
SEALED

NOV 4 1969

(SEAL)
Attest:

Edward M. Fletcher, Jr.
Attesting Officer

WILLIAM E. SCHUYLER, JR.
Commissioner of Patents